United States Patent [19]

Mauboussin

[11] 4,144,757
[45] Mar. 20, 1979

[54] DEVICES FOR CONTROLLING THE LEVEL OF A LIQUID IN A TANK

[75] Inventor: Joël Mauboussin, Bezons, France

[73] Assignees: Automobiles Peugeot; Societe Anonyme Automobiles Citroen, both of Paris, France

[21] Appl. No.: 893,797

[22] Filed: Apr. 5, 1978

[30] Foreign Application Priority Data

Apr. 15, 1977 [FR] France .................................. 77 11472

[51] Int. Cl.² ............................................. H01H 35/18
[52] U.S. Cl. ......................................... 73/308; 73/313;
200/84 R; 340/625
[58] Field of Search ............................ 200/61.2, 84 R;
340/623–625; 73/308, 313, 317, 319, 322.5

[56] References Cited

U.S. PATENT DOCUMENTS

| 2,714,641 | 8/1955 | Van Nort | 200/84 R |
| 2,902,683 | 9/1959 | Wheeler | 73/308 |
| 3,038,045 | 6/1962 | Gonetz | 200/84 R |
| 3,555,905 | 1/1971 | George | 73/322.5 |

Primary Examiner—Gerald P. Tolin
Attorney, Agent, or Firm—Burns, Doane, Swecker & Mathis

[57] ABSTRACT

The device comprises a float which is guided by a retaining device and cooperates with a switch located adjacent the bottom of a fuel tank and carried by the retaining device. An elastically yieldable device interposed between a support secured to the top wall of the tank and the retaining device biases the latter against the bottom wall of the tank.

3 Claims, 2 Drawing Figures

DEVICES FOR CONTROLLING THE LEVEL OF A LIQUID IN A TANK

The present invention relates to a device for producing a signal when the level of a liquid contained in a tank descends below a given value. It is in particular applicable to fuel tanks in automobile vehicles.

Fuel tanks of automobile vehicles are usually provided with a system for supervising the level, comprising a detector and a receiver. The detector which is placed in a tank and secured to the upper wall thereof, comprises a rheostat the resistance of which varies with the position of a float associated therewith and therefore in accordance with the height of the liquid. The receiver placed on the dashboard or instrument panel of the vehicle is formed by a moving part the position of which varies in accordance with the current in the two coils surrounding it. This control system is unfortunately rather inaccurate and this inaccuracy is the greater as the amount of liquid is small owing to the effect of manufacturing tolerances and to the fact that the rheostat is secured to the upper wall of the tank. There is therefore much uncertainty as to the distance that the vehicle can travel when the needle of the fuel gauge approaches the zero position.

Devices are also known from the U.S. Pat. Nos. 1,642,434 and 3,038,045 which comprise a float provided for cooperating with contacts fixed relative to the bottom of the tank. Such an arrangement permits obtaining an indication as soon as the level of the fuel contained in the tank descends below a given value. However, in these prior arrangements, the precision of the measurement carried out is considerably affected by dimensional differences which may exist from one fuel tank to another.

An object of the invention is to overcome these drawbacks and to provide a particularly simple device which gives, in addition to the indication furnished by the conventional gauge, information as soon as the level of fuel descends below a given value, the switch, which is fixed relative to the bottom of the tank, being positioned correctly even in the case of dimensional differences in particular in the distance between the upper wall and the bottom of the tank.

According to the invention there is provided a device comprising a float guided by retaining means and cooperating with a switch positioned relative to the bottom of the tank, wherein the switch is carried by said retaining means, the retaining means being elastically biased against the bottom of the tank by elastically yieldable means whereby the retaining means are connected to a support fixed to the upper wall of the tank.

According to other features:

The float is guided by retaining means which carry the switch, said retaining means being elastically urged against the bottom of the tank.

Said retaining means are connected by elastically yieldable means to the support of a level detector which is fixed to the upper wall of the tank and provides a continuous indication.

An embodiment of the invention will be described hereinafter with reference to the accompanying drawing, in which.

Figure 1:
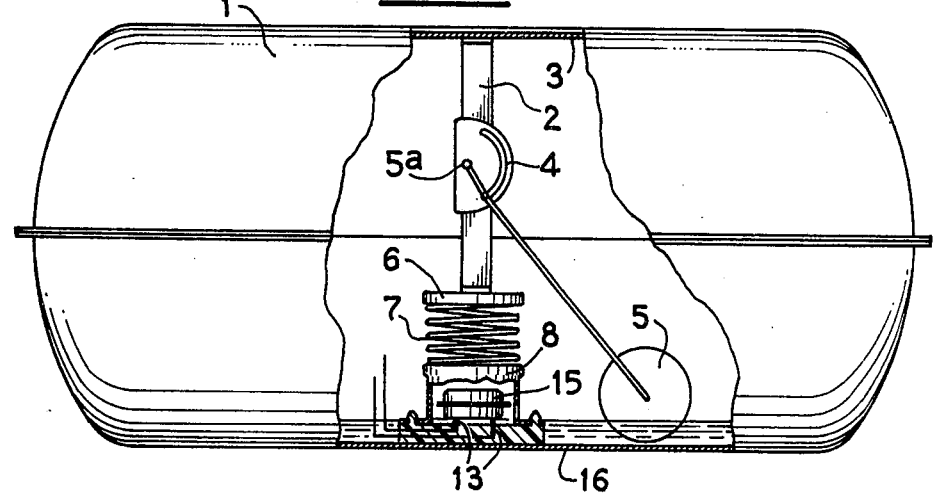
FIG. 1 is a sectional view through a fuel tank.
Figure 2:
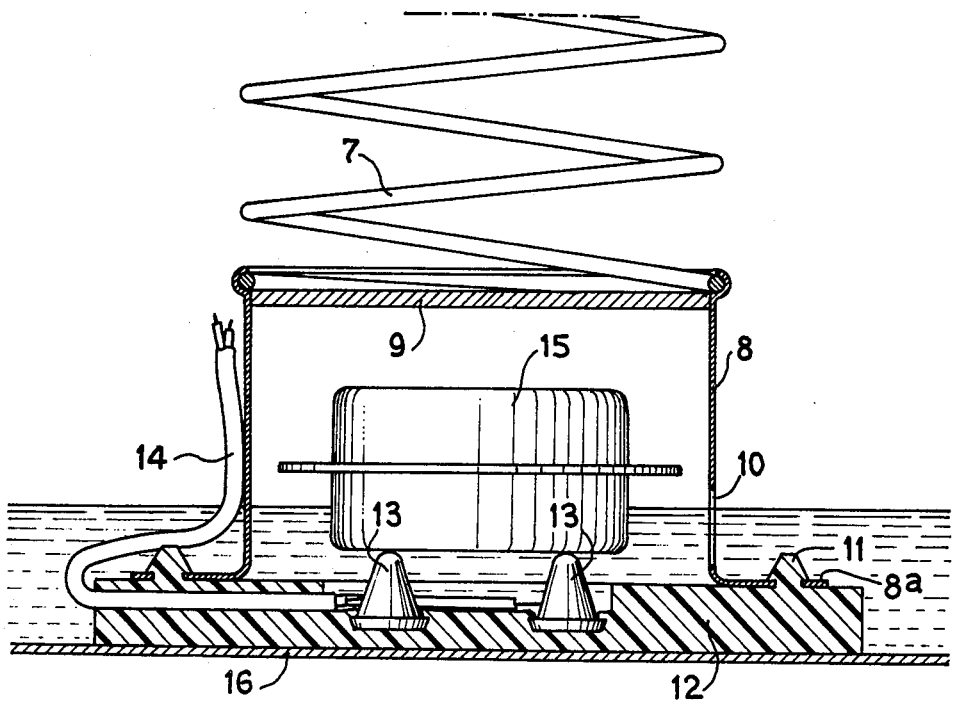
FIG. 2 is an enlarged sectional view of a detail of FIG. 1.

FIG. 1 shows a fuel tank 1 provided with a conventional level detector mounted on a support 2 fixed to the upper wall 3 of the tank. This detector comprises, in the known manner, a rheostat 4 the resistance of which varies as a function of the position of a float 5 which is pivotally mounted on a pin $5^a$. The rheostat 4 is inserted in a circuit comprising an indicator device (not shown).

Fixed to the base of the support 2 by clips, welding or other means, is a plate 6 the edges of which are clipped to a spring 7. Fixed to the other end of the spring 7, for example by clips, is a cage 8 which is closed in its upper part by a plate 9. The cage 8 has openings 10 for putting the interior of the cage in communication with the tank and is fixed by a flange $8^a$ and lugs 11 to a plate 12 of insulating material, for example an elastomer.

Mounted in the plate 12 and projecting from the upper side thereof are two contact studs 13 which are connected by wires 14 to an alarm system (not shown), for example a light signal.

Disposed within the cage 8 is a float 15 having a cylindrical or parallel-sided shape and such dimensions that it cannot turn over and bears essentially on the two studs 13 when it does not float. This float 15 is electrically conductive or carries a conductive plate on its lower side.

It can be seen that the device just described is easily adaptable to a conventional level detector with which it forms an assembly easily mounted inside the tank. The presence of the spring 7 ensures that the plate 12 is applied against the bottom 16 of the tank so that the two studs 13 are positioned relative to this bottom 16 even if there are differences in the distance between the walls 3 and 16 from one tank to another.

So long as a notable amount of fuel remains in the tank 1 the float 15 is maintained separated from the studs 13 while remaining trapped within the cage 8. The driver can observe the evolution of the fuel in the tank by means of the conventional supervising system.

As soon as the fuel level descends below a critical value, the float 15 bears against the studs 13 and closes the circuit between the studs 13 which actuates the alarm signal and therefore informs the driver in a precise manner on the remaining amount of fuel and on the distance he can still travel in the vehicle.

It can be seen that this information is completely independent of any differences which may exist both in the features of the components of the conventional control system and in the dimensions of the tank, which constitutes a particularly appreciable advantage. Moreover, owing to its form and the presence of the cage 8, the float 15 is relatively little sensitive to displacements of the fuel in the tank under the effect of jerks and vibrations so that the information it supplies is also stable and does not result in an intermittent actuation of the associated signal.

Having now described my invention what I claim as new and desire to secure by Letters Patent is:

1. A device for indicating the level of a liquid contained in a tank having an upper wall and a bottom wall, comprising, in combination with the tank, a support fixed to the upper wall, retaining means, a float quidedly combined with the retaining means to be movable between an upper position and lower position, a switch carried by said retaining means and cooperative with the float to be closed by the float when the latter is in said lower position and opened when the float is in said upper position, elastically yieldable means interposed between said support and the retaining means for elastically biasing the retaining means against the bottom wall of the tank.

2. A device as claimed in claim 1, wherein the retaining means comprise a cage and a plate of an elastically yieldable material which forms the bottom of the cage and is secured to the cage, two contacts being carried by the elastically yieldable material and projecting with respect to the bottom of the cage and constituting said switch.

3. A device as claimed in claim 1, comprising a fuel level detector which is carried by said support and supplies a continuous indication.

* * * * *